United States Patent

Kuester

[11] 4,186,768
[45] Feb. 5, 1980

[54] PRESSURE SENSITIVE HYDRAULIC VALVE

[75] Inventor: Donald W. Kuester, West Hyattsville, Md.

[73] Assignee: The United States of America as represented by the Secretary of the Navy, Washington, D.C.

[21] Appl. No.: 805,645

[22] Filed: Apr. 10, 1959

[51] Int. Cl.² .............................................. F16K 15/14
[52] U.S. Cl. .............................. 137/516.25; 102/18 R; 137/498; 137/512; 137/852
[58] Field of Search ....................... 137/793, 460, 493.9, 137/498, 505, 505.13, 510, 511, 512, 516.25, 517, 852; 251/335.1, 18, 61, 75, 76, 331, 126, 127, 142, 143, 146, 212, 368, 335 A; 73/276, 271; 267/1 C; 102/18 R; 29/173, 454

[56] References Cited

U.S. PATENT DOCUMENTS

| 922,578 | 5/1909 | Gries | 137/517 |
|---|---|---|---|
| 2,123,381 | 7/1938 | Reichel | 29/454 |
| 2,604,316 | 7/1952 | O'Brien et al. | 29/173 |
| 2,684,081 | 7/1954 | Grace | 137/517 |
| 2,687,745 | 8/1954 | Hackett | 137/460 |
| 2,761,206 | 9/1956 | Peters | 29/454 |
| 2,882,921 | 4/1959 | Webber | 137/460 |
| 2,895,506 | 7/1959 | Langsfeld | 137/793 |

Primary Examiner—Stephen C. Bentley
Attorney, Agent, or Firm—R. S. Sciascia; A. L. Branning

EXEMPLARY CLAIM

1. A sensitive blocking valve device comprising a casing, said casing comprising a pair of half-shell members each including a mating surface at the outer periphery and each having an axial valve seat portion projecting into the interior of said casing and in mutual alignment, an axial orifice through the valve seat portion of each half-shell member, a metallic valve wafer comprising a central valving portion disposed to move to close either of said orifices in said valve seat portions of the casing and having an integral double spiral flat spring formed integrally therewith and extending from said central portion, and an annular portion at the outer periphery of said double spring and formed integrally therewith, said annular portion being disposed in clamped relation between said half-shell members, said wafer including said double flat spring and annular portion all being of the same uniform thickness and planar when the valve device is unoperated.

10 Claims, 10 Drawing Figures

PRESSURE SENSITIVE HYDRAULIC VALVE

The invention described herein may be manufactured and used by or for the Government of the United States of America for governmental purposes without the payment of any royalties thereon or therefor.

This invention relates to a sensitive hydraulic valve and the method employed in making same and more particularly to a sensitive hydraulic blocking or rectifying valve suitable for the protection of the pressure sensing mechanism for marine mines from damage due to overloading the mechanism by excessive pressure such as may occur due to explosions within the water in the vicinity of the mine.

In sensitive valves of this type heretofore devised it has been the usual practice to incorporate rubber parts in the valve mechanism. Such parts prove to be unreliable in service as the result of deleterious effects of hydraulic fluids used in the pressure mechanism and hardening of the valve parts as the result of leaching out of the plasticizers of which they were composed.

The valve of the instant invention possesses all of the advantages of the prior art devices and none of the foregoing disadvantages.

In accordance with the present invention this desirable result is achieved by employing a valve closure element composed of thin flexible metal such as beryllium copper photochemically etched to a predetermined and double spiral configuration and provided with a centrally disposed area movable by a predetermined small pressure differential thereagainst into engagement with a valve seat or selectively into engagement with a pair of valve seats, as the case may be. The valve is particularly well suited for use with the pressure sensing mechanism of a marine mine to prevent damage to the mechanism as the result of a countermine explosion, for example, while permitting access of the pressure to the pressure sensing mechanism resulting from a ship's pressure signature, as will more clearly appear as the description proceeds.

One of the objects of the present invention is the provision of a new and improved sensitive hydraulic blocking valve for use with the pressure sensing mechanism of a mine.

Another object is the provision of a quick acting low pressure hydraulic valve of new and improved construction.

Still another object is the provision of a sensitive low pressure check valve of novel construction for effectively blocking unwanted pressure impulses from reaching a pressure sensitive firing mechanism for a marine mine.

A further object is a new and improved method of producing a sensitive hydraulic valve element.

A still further object is to provide a low pressure sensitive hydraulic valve which is of simple structure, economical to fabricate and which possesses all of the desirable qualities of sensitiveness, ruggedness and reliability in service.

Still other objects, advantages and improvements will be apparent when the following description taken in connection with the accompanying drawings on which:

Figure 1:
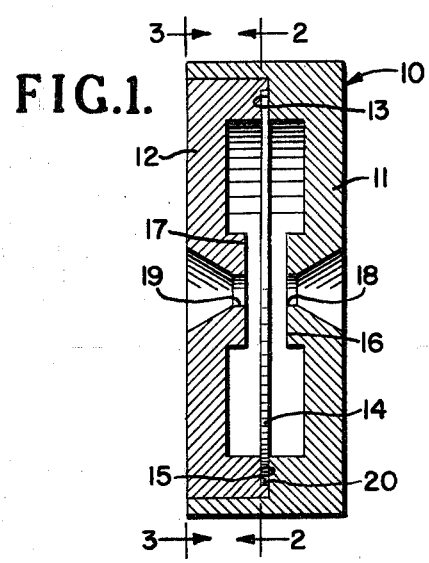
FIG. 1 is a view in section of a two-way blocking valve in accordance with a preferred embodiment of the invention.
Figure 2:
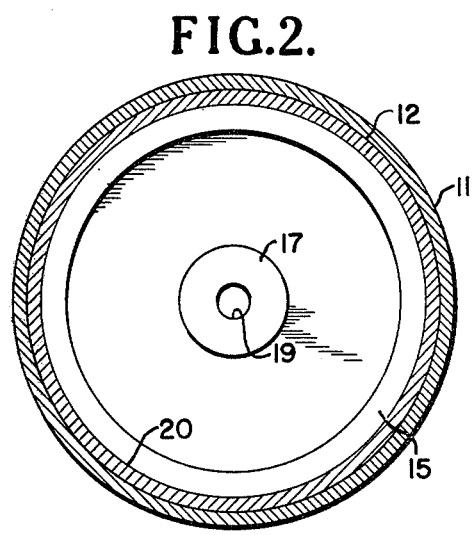
FIG. 2 is a view taken along the line 2—2 of FIG. 1.
Figure 3:
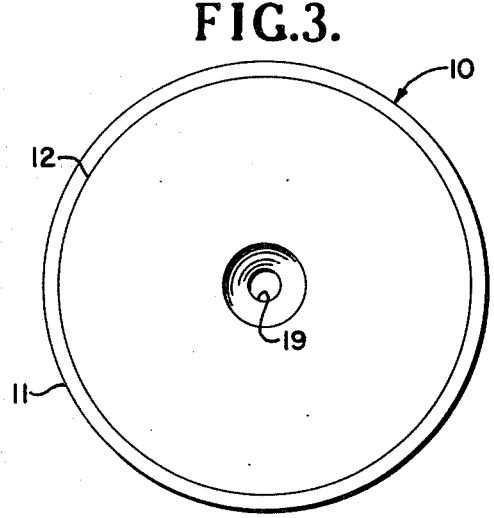
FIG. 3 is a view taken along the line 3—3 of FIG. 1.

Referring now to the drawings on which like numerals are employed to designate like parts for a more complete understanding of the invention and more particularly to FIG. 1 thereof, there is shown therein a sensitive two-way blocking valve mechanism designated generally by the numeral 10 and comprising two nested housings 11 and 12. The housing 11 is provided with a shoulder 13 for engagement with an outer annular portion of the wafer valve element 14 held securely thereagainst by a complementary shoulder 15 on housing 12. The housings 11 and 12 are composed of metal suitable for the purpose such, for example, as aluminum or brass, the housing 11 having a valve seat 16 formed thereon and the housing 12 being provided with a valve seat 17 oppositely disposed with respect to the valve seat 16. There is also provided a shoulder 20 on housing 12 of sufficient height to prevent distortion of the valve element 14 when housings 11 and 12 are clamped together. The parts are so proportioned that the valve element 14 is normally positioned intermediate the valve seats 16 and 17 and preferably equidistant therefrom. The housing 11 is also provided with a bore 18 in communication with valve seat 16 and in like manner housing 12 is provided with a bore 19 in communication with valve seat 17.

Figure 4:
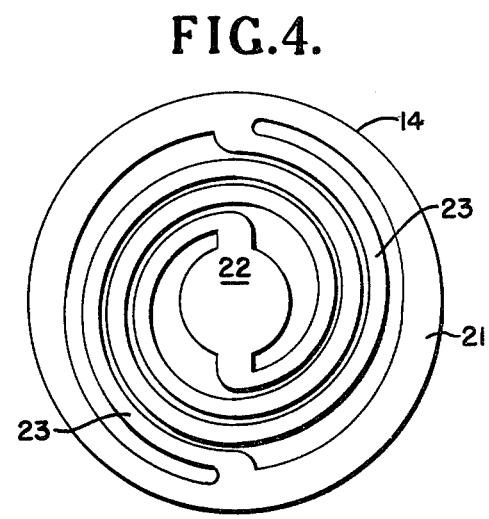
FIG. 4 is an end view of the movable valve element of FIG. 1.

Referring now to FIG. 4 the valve element 14 is provided with an annular portion 21 to which is connected the movable valve element 22 by a pair of interspaced spiral elements 23, the annular portion of the valve, the spiral elements and the movable valve element 22 being of integral construction. An arrangement is thus provided in which the movable valve element 22 is normally yieldably maintained in the plane of the annular member 21 and movable selectively in either direction therefrom by a predetermined pressure differential applied thereto. The sensitive movable valve member is of thin construction, a thickness of 0.002 inches having been found to be satisfactory. The fabrication of this element in a single plane and without any internal stresses imparted thereto is important to the successful operation of the device and the method by which this is achieved will be described in greater detail hereinafter.

Figure 5:
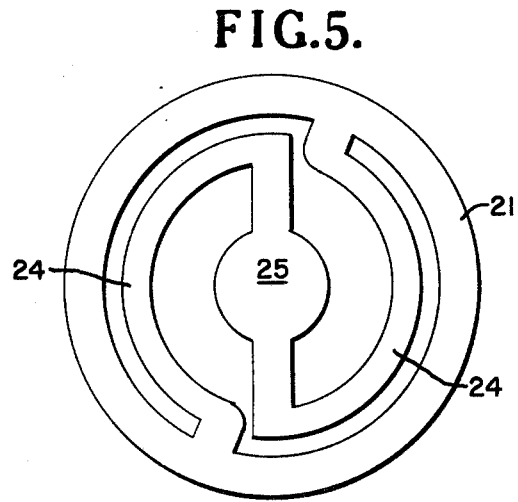
FIG. 5 is a view of a valve element suitable for use with the device of FIG. 1 according to an alternative form thereof.

The movable element of the valve according to an alternative form thereof is shown on FIG. 5. In accordance with this embodiment of the invention, the annular portion 21 thereof supports a air of circular elements 24 to which is secured a movable valve element 25. This wafer valve element may be employed interchangeably with the valve element of FIG. 4 and differs therefrom only in the circular elements 24 employed to support the movable valve element 25, the spiral elements of FIG. 4 each spanning an angle of 540° whereas the circular elements 24 of FIG. 5 are each disposed about an angle of substantially 180°. It should be noted that the spiral support configuration of FIG. 4 results in a more sensitive valve element than the configuration of FIG. 5.

Figure 9:
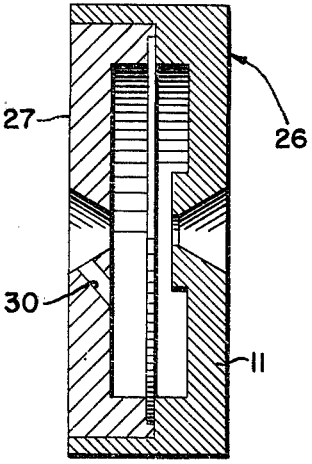
FIG. 9 is a view in section of a check or rectifying valve generally similar to FIG. 1.

Referring now to FIG. 9, there is shown thereon a check or rectifying valve indicated generally by the numeral 26 and comprising a housing 11 within which is nested a housing 27. The housing 27 is generally similar to housing 12 except that the valve seat 17 of housing 12 has been omitted and a bypass aperture 30 is preferably provided. The housings 11 and 27 are each provided with a bore substantially as shown. Supported between housings 11 and 27 is the movable valve element of either FIG. 4 or FIG. 5, as the case may be, the preference being to employ the FIG. 4 valve element.

Figure 10:
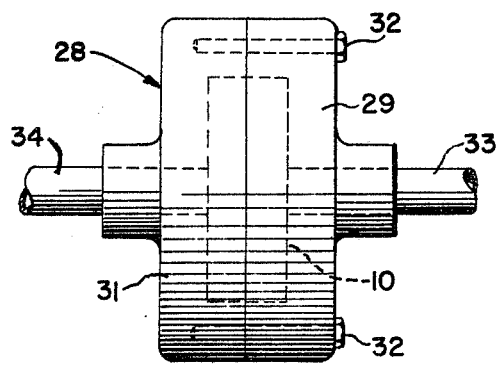
FIG. 10 is a view of a detachable coupling for maintaining the valve of FIG. 1 or FIG. 9 in an assembled condition.

On FIG. 10 is shown a detachable coupling generally indicated by the numeral 28 and comprising two separable coupling portions 29 and 31 held together by screws 32. The couplings 29 and 31 are recessed to receive either valve mechanism 10 or 26, as shown in dashed outline and maintained in the two nested housings thereof tightly clamped together. The coupling portions 29 and 31 are each provided with a centrally disposed bore within which is secured in sealed relation therewith a pair of ducts 33 and 34, respectively, thereby to establish external fluid communication with the bores of the valve mechanism.

The method of fabricating the valve element 14 of FIG. 4 will now be described. The element is composed of sheet metal suitable for the purpose such, for example, as beryllium copper rolled stock approximately 0.002 inches in thickness. It is configured by a photoetching process similar to that employed in printed circuits, the essential difference in this case being that the opposite side of the material has to be protected. Both sides of the beryllium copper are coated with a photosensitive resist similar to that employed in the printed circuit field. When this has been done the back side of the element is exposed to an arc light for a period of about four minutes which sets the resist. The other side is now exposed with a suitable negative which has the desired design on it. The areas that the light is blocked from are not affected, of course, by exposure to the arc light and when the piece of metal is developed using a suitable developer and washed, the areas not struck by the arc light are washed leaving a clean surface which is then etched away by the photoetching solution, a solution suitable for the purpose having been found to be composed of ferric chloride with a small amount of acid, such as hydrochloric acid, added thereto as is employed in a conventional etching system. This etches the valve leaving no strains in the metal and the valve can then be cleaned by reimmersing in a commerical developer.

When this has been done, the assembly is heat treated between two flat ground plates having a high pressure of about 100 pounds per square inch applied thereto, a temperature of 560°–600° F. having been found satisfactory for the heat treating of the material. By applying pressure to the assembly in the manner described, the assembly is maintained flat during the heat treating process, which of course, is an essential characteristic of this piece, since, if it were not flat, the closing force in one direction would be different from the closing force required in the opposite direction. Furthermore, the exact location of the movable valve with respect to the valve seat is critical for determining the exact closing pressure of the valve. The outer edge of this valve is a continuous ring which, as heretofore described, is supported within the housing. The center portion which is movable into engagement with the seat of the valve is yieldably supported by means of a double spiral configurated spring, the outer ends of which are secured to the outer annular section of the valve element in integral construction. A device is thus provided in which the center valve portion is adapted to move readily from an initial position and requires very little force to do so. The exact proportions and construction of this valve are such that the valve will close at approximately forty inches of hydrostatic head when in series with a three megohm hydraulic or acoustical resistor unit and will reopen when the pressure of the water has been reduced to a head of 8 to 10 inches of water. A valve element suitable for this purpose has been found to be approximately 0.355 inches in outside diameter and possess a configuration substantially as shown and when assembled between the pair of housings to be approximately 0.010 inch when in the normal position from the valve seats each of which has a bore therein of 0.063 inches.

By arranging the valve in series with another resistor such that as the pressure drop across the valve increases, more and more pressure is available to close it and thus it is a sensitive valve having a sharp snap action on closing. Furthermore the design of the valve is such that the quantity of fluid transmitted, during a step function, such as might result from a countermine explosion or other sudden increase in pressure of the ambient water, is very small. It is an essential requirement of this valve that when the valve closes by a sudden increase of differential pressure applied thereto such as would result from the receipt of a countermine explosion which may cause peak pressures of the order of 1500 psi, the total fluid flow through the valve before closure must be small in order to protect the pressure detecting device of the mine. This valve meets this requirement and closes with a total fluid flow of the order of 1/100 of a cubic centimeter prior to closure.

The maximum pressure level that this valve may be subjected to is about 1500 psi and it has been found that this valve operated satisfactorily using 1500 psi available from a nitrogen cylinder, for example, and without damage thereto or damage to the operating mechanism thereof as the result of this pressure.

Although the valve has been described with particularity as comprising a movable valve element disposed midway between two valve seats, it will be understood that this has been done by way of example and the valve element may, if desired, be disposed at unequal distances from the valve seats. Furthermore the apertures within the respective valve seats may be of different diameters if desired.

Figure 6:
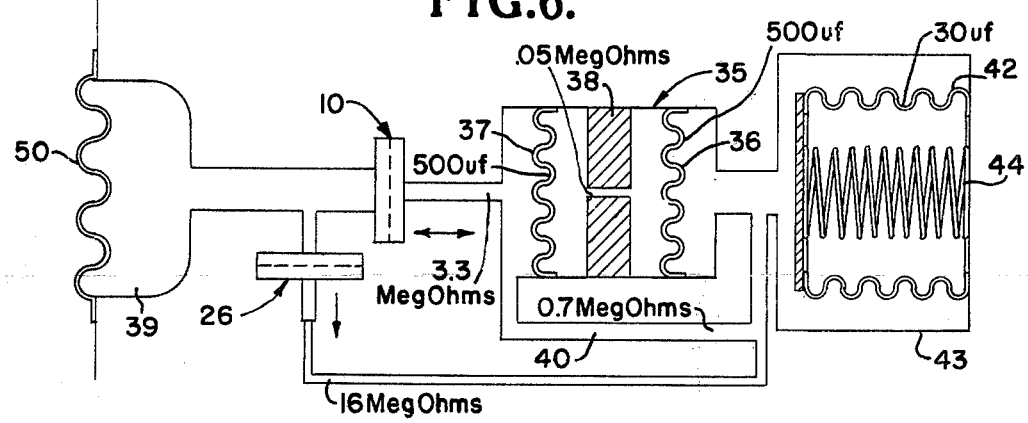
FIG. 6 is a diagrammatic view of the pressure sensing mechanism of a marine mine employing the device of the present invention.

The valve of the instant invention is particularly well adapted for use with the firing mechanism of a pressure mine in which the pressure sensing mechanism comprises an electrolytic cell having a solution of potassium iodide therein and known in the art as a Solion detector indicated on FIG. 6 at 35. The potassium iodide solution is confined within the electrolytic element by a pair of flexible diaphragms 36 and 37 between which is disposed a baffle member 38 having an aperture 39 therein through which the electrolyte is adapted to flow in response to a pressure differential applied to the diaphragms 36 and 37, as is well known in devices of this character. The diaphragm 37 is in fluid communication with the blocking valve 10 from whence the fluid circuitry is continued to a chamber 39 having a flexible diaphragm 50 enclosing a quantity of silicone oil and to maintain a flexible connection between the oil and the surrounding sea water whereby pressure variations within the sea water are transmitted to the silicone oil within the chamber 39. The interior of chamber 39 is also in fluid communication with rectifying valve 26 from whence the fluid circuit is continued to the outer surface of diaphragm or compliance 36 and to the exterior of an expansible bellows or compliance 42 disposed within the housing 43 and yieldably maintained in an expanded position by a spring 44. There is also provided a branch fluid duct 40 interconnecting the outer surfaces of flexible diaphragms 36 and 37.

Figure 7:
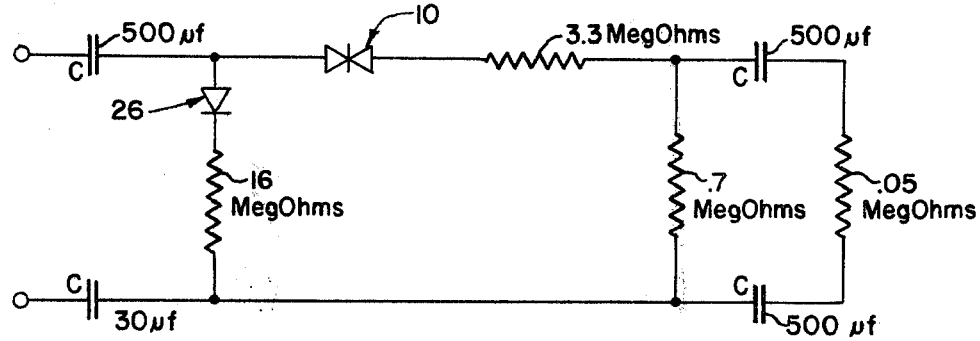
FIG. 7 is an electrical analog of the pressure system of FIG. 6.

The operation of FIG. 6 will best be understood by reference to the electrical analog of FIG. 7 on which are shown the electrical values of each of the components thereof corresponding to the hydraulic ompo- nents of FIG. 6. The device of FIG. 6 having hydraulic or acoustical components in accordance with these values has been found to give satisfactory operation in service. In the analogous electrical system of FIG. 7, C is, of course, defined by the equation $$C = \frac{q}{v} \text{ i.e. capacitance} = \frac{\text{quantity of change}}{\text{voltage}}.$$

Accordingly, hydraulic or acoustic compliance is defined by the analogous quantities $$C = \frac{\text{volume of fluid}}{\text{pressure}} = \frac{cm^3}{dynes/cm^2}$$

in the cgs system. Similarly, $$\text{hydraulic or acoustic resistance} = \frac{dynes/cm^2}{cm^3/sec};$$

and $$\text{hydraulic or acoustic inertance} = \frac{dynes/cm^2}{cm^3/sec^2}.$$

The operation of the system of FIG. 6 will now be described. When a vessel moves above the mine, there is a reduction in hydrostatic head at the mine in the order of 6 to 12 inches in accordance with the well known Bernoulli law. This pressure is insufficient to operate blocking valve 10 to a close position as it will be recalled that the valve 10 closes only when a pressure at least as great as forty inches of water is applied thereto. The electrolytic cell or Solion detector 35 is thus caused to operate in response to the pressure signature of the vessel and fire the mine.

When an anticountermine explosion occurs in the water the flexible diaphragm 50 of the pressure mechanism is first exposed to a very high positive pressure, short-duration signal followed by a lower amplitude negative signal of much longer duration. The high pressure positive signal causes valve 10 to close immediately thus preventing positive flow through the Solion detector. This same signal is applied to rectifying valve 26 which is open to flow in this direction; however because of the high impedance offered by the hydraulic resistor in series with valve 26 a negligible amount of flow occurs due to the inertance or inertia of the fluid and the short duration of the positive signal. When the reverse or negative wave occurs both valves 10 and 26 close thus preventing a build up of excess positive hydraulic charge or pressure on the seaward side of the pressure detector. Since no significant hydraulic flow has occurred during this anticountermine explosion, the pressure mechanism is effectively shielded from its effect. Had the valves 10 and 26 not been present in the hydraulic circuit, the mechanism would have registered a firing signal within a few minutes after the explosion in response to the hydraulic transients introduced during the explosion.

Figure 8:
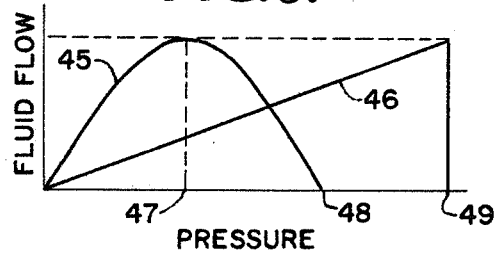
FIG. 8 is a view on which is shown in graphic form the operation of a prior art device and the device of the instant invention.

The snap action of the valve of the instant invention will best be understood by consideration of FIG. 8 on which is shown in graphic form by the curve 45 the fluid flow vs pressure relationship for the valve element per se and, by the curve 46, the valve element connected in combination with a series hydraulic resistor. As shown in the curve 45, as pressure applied thereto is increased, the fluid flow is increased up to point 47 after which a further increase in pressure results in decreased flow until point 48 is reached at which point the valve is completely closed. It should be noted that up to point 47 the valve has a positive resistance characteristic and in the region from point 47 to point 48 it has a negative resistance characteristic. When used in combination with a series resistor as shown by curve 46, a resistance of about 3 hydraulic or acoustic megohms having been found suitable for this purpose, the fluid flow increases linearly with increasing pressure up to a flow corresponding to the maximum flow rate for the valve indicated by the dashed line across the top of FIG. 8 drawn tangent to the curve 45 at ordinate marked point 47. Further increase in pressure beyond this point results in an unstable condition created by the negative resistance characteristic of the valve. As flow is increased, the resistance of the valve to such flow is increased at an accelerated rate which causes an increase in the differential pressure available to close the valve which effects a rapid transition and complete snap action closure of the valve. This is illustrated in FIG. 8 by the abrupt drop in line 46 from the dashed line to the point 49. The valve will not reopen until the pressure differential thereacross has been reduced to a value corresponding to the pressure at point 48.

Although the invention has been described with reference to several embodiments thereof which give satisfactory results, it is not so limited as it is susceptible of many alterations and modifications without departing from the spirit and scope thereof and it is intended, therefore, in the appended claims to cover all such alterations and modifications.

What is claimed as new and desired to be secured by Letters Patent of the United States is:

1. A sensitive blocking valve device comprising a casing, said casing comprising a pair of half-shell members each including a mating surface at the outer periphery and each having an axial valve seat portion projecting into the interior of said casing and in mutual alignment, an axial orifice through the valve seat portion of each half-shell member, a metallic valve wafer comprising a central valving portion disposed to move to close either of said orifices in said valve seat portions of the casing and having an integral double spiral flat spring formed integrally therewith and extending from said central portion, and an annular portion at the outer periphery of said double spring and formed integrally therewith, said annular portion being disposed in clamped relation between said half-shell members, said wafer including said double flat spring and annular portion all being of the same uniform thickness and planar when the valve device is unoperated.

2. A sensitive blocking valve device comprising a casing composed of two separable sections, each of said sections having a planar valve seat comprising a planar valve surface disposed in proximate parallel relation with respect to the valve surface of the other section, a sensitive flexible valve member clamped between said sections intermediate said valve seats and normally disengaged therefrom, means for clamping said sections together, said valve member comprising a thin flat valve element having two elongated outwardly extending flexible convoluted supports secured at the inner ends thereof to opposite diametral portions of the valve member, and an annular outer member to which the outer ends of said supports are affixed, said outer member, supports and valve element being of integral construction of the same uniform thickness and planar when the valve device is unoperated.

3. A sensitive valve comprising a pair of half-shell casing members each having an axial valve seat with a centrally disposed orifice extending therethrough, a closure element movable in either direction from an initial position of rest intermediate the valve seats and adapted to engage the valve seats selectively and close the respective orifice by a predetermined pressure differential applied thereto, convoluted spring means for yieldably supporting said closure element in said initial position, the outer end of said spring means being of annular configuration and supported by said half-shell casing members, said closure element and spring means being of the same uniform thickness, planar and disposed in a single plane when the valve is unoperated, and means for clamping said half-shell casing members together, said clamping means having a pair of ducts connected therewith for establishing external fluid communication to each of said orifices respectively.

4. A sensitive quick acting valve comprising a valve seat, a valve member yieldably supported in an initial position in proximate spaced relation to said seat and movable into engagement therewith by a predetermined differential pressure applied thereto, a pair of oppositely disposed convoluted spring elements connected to said valve member for yieldably supporting said valve member in said initial position, and an annular member secured to the outer end of each of said spring elements, said annular member, spring elements and valve member all being of the same thickness and disposed in a single plane when the valve is unoperated.

5. A valve according to claim 4 in which said annular member, spring elements and valve member are formed from a single sheet of spring metal.

6. A valve according to claim 5 in which said metal is beryllium copper.

7. A sensitive quick acting valve having a planar valve seat, a thin flat metallic valve element having a pair of flat diametrically disposed convoluted spring elements secured thereto for yieldably supporting the valve element in an initial position in planar coincidence therewith and means for supporting the outer ends of said convoluted spring elements in such manner that the valve element is yieldably disposed in proximate parallel spaced relation with respect to said valve seat, said valve and spring elements being of the same uniform thickness and planar when the valve element is in the initial position.

8. A valve according to claim 7 including a second planar valve seat disposed in proximate spaced relation on the opposite side of said valve element and parallel thereto.

9. A valve according to claim 7 in which the convoluted spring elements are each configured spirally throughout an arc of substantially 540°.

10. A valve according to claim 7 in which the spring elements are each of circular configuration throughout an arc in excess of 135° and less than 180°.

* * * * *